United States Patent
Kim et al.

(10) Patent No.: US 12,001,709 B2
(45) Date of Patent: Jun. 4, 2024

(54) STORAGE DEVICES AND OPERATING METHODS OF STORAGE CONTROLLERS

(71) Applicant: Samsung Electronics Co., Ltd., Suwon-si (KR)

(72) Inventors: Chanha Kim, Hwaseong-si (KR); Gyeongmin Nam, Seoul (KR); Seungryong Jang, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 111 days.

(21) Appl. No.: 17/682,084

(22) Filed: Feb. 28, 2022

(65) Prior Publication Data
US 2023/0036616 A1  Feb. 2, 2023

(30) Foreign Application Priority Data
Jul. 29, 2021 (KR) .......................... 10-2021-0100138

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 10,147,500 B2 | 12/2018 | Cai et al. | |
| 10,310,924 B2 | 6/2019 | Jei et al. | |
| 10,372,342 B2 | 8/2019 | Dusija et al. | |
| 10,489,084 B2 | 11/2019 | Park et al. | |
| 10,854,290 B1 | 12/2020 | Wu et al. | |
| 2015/0355845 A1* | 12/2015 | Lee | G06F 3/0659 |
| | | | 711/103 |
| 2016/0342458 A1* | 11/2016 | Cai | G06F 12/0246 |
| 2020/0118636 A1* | 4/2020 | Athreya | G06F 3/0659 |
| 2021/0004323 A1 | 1/2021 | Kang | |
| 2021/0349662 A1* | 11/2021 | Helm | G06F 3/0659 |
| 2022/0342812 A1* | 10/2022 | Cariello | G06F 12/0882 |
| 2022/0342813 A1* | 10/2022 | Muchherla | G11C 16/3422 |
| 2023/0011946 A1* | 1/2023 | Lee | G11C 16/08 |

\* cited by examiner

*Primary Examiner* — Stephanie Wu
(74) *Attorney, Agent, or Firm* — Myers Bigel, P.A.

(57) ABSTRACT

Storage devices and an operating method of a storage controller configured to control storage devices. For example, the storage device may include a non-volatile memory and a storage controller. The non-volatile memory includes a first block and a second block, the first block including first memory cells each storing N-bit data, and the second block including second memory cells each storing M-bit data. During a read reclaim operation on the first block, the storage controller determines read hot data stored in the first block and writes the read hot data to the second block. The storage controller may select a first word line corresponding to a first page in which a number of error bits is equal to or greater than a threshold value and determine data stored in a page corresponding to a second word line adjacent to the first word line as the read hot data.

17 Claims, 13 Drawing Sheets

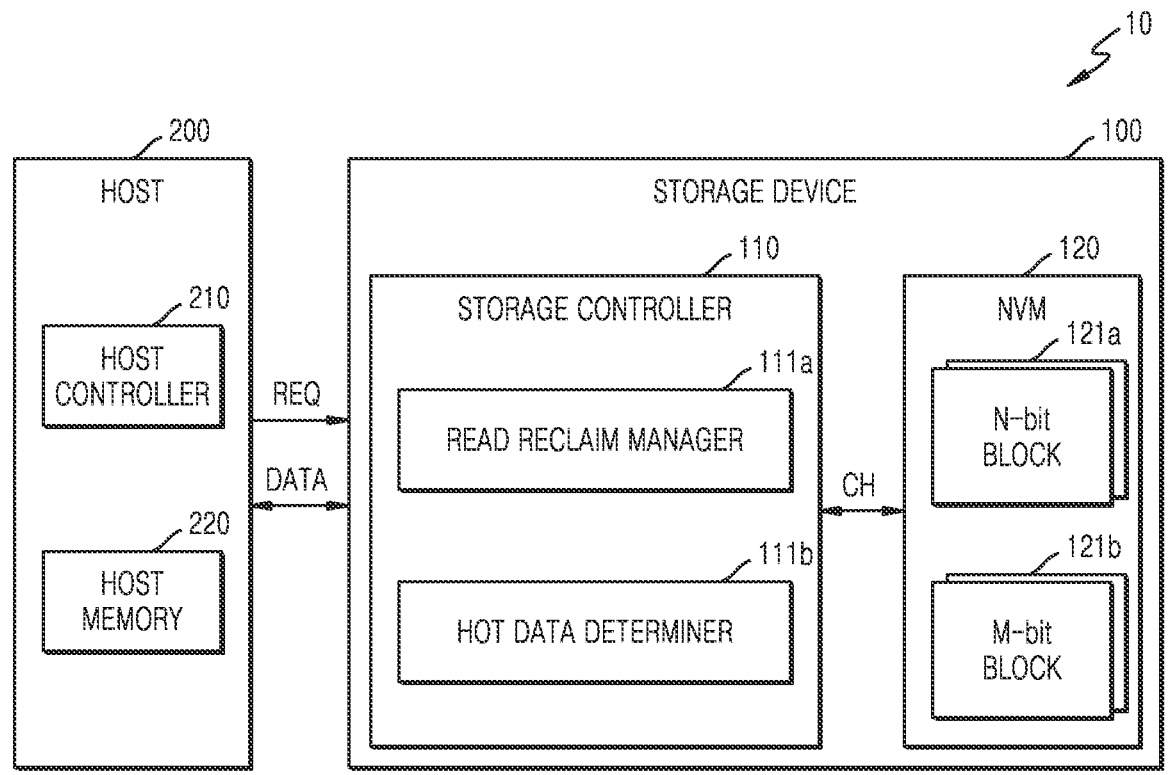

| LOGICAL ADDRESS | INITIAL PHYSICAL ADDRESS | UPDATED PHYSICAL ADDRESS |
|---|---|---|
| LPN1 | PPN1 | PPN1 |
| LPN2 | PPN2 | PPN2 |
| LPN3 | PPN3 | PPNc |
| LPN4 | PPN4 | PPN4 |
| ... | ... | ... |

STORAGE DEVICES AND OPERATING METHODS OF STORAGE CONTROLLERS

CROSS-REFERENCE TO RELATED APPLICATION

This application is based on and claims priority under 35 U.S.C. § 119 to Korean Patent Application No. 10-2021-0100138, filed on Jul. 29, 2021, in the Korean Intellectual Property Office, and the disclosure of the above-identified application is incorporated by reference herein in its entirety.

TECHNICAL FIELD

The present disclosure relates to memory devices, and more particularly, to storage devices and operating methods of storage controllers.

BACKGROUND

As a non-volatile memory, a flash memory may retain stored data even when power is interrupted. Recently, storage devices including flash memories, such as embedded multi-media cards (eMMC), universal flash storages (UFS), solid state drives (SSD), memory cards, and the like, have been widely used, and storage devices are useful for storing or transporting a large amount of data. Improved storage devices, and methods and apparatuses for improving the performance and the reliability of storage devices, are in high demand.

SUMMARY

Aspects of the present disclosure provide storage devices capable of improving read reliability and performance, and operating methods of storage controllers.

According to some aspects of the inventive concepts, there is provided a storage device including a non-volatile memory including a plurality of memory blocks including a first block and a second block. The first block includes first memory cells each configured to store N-bit data, and the second block includes second memory cells each configured to store M-bit data, with N and M both positive integers and N greater than M. The store device includes a storage controller configured to, during a read reclaim operation on the first block, determine read hot from among a plurality of pieces of data stored in the first block and write the determined read hot data in the second block. The storage controller includes a hot data determiner configured to, during the read reclaim operation, select a first word line corresponding to a first page in which a number of error bits is equal to or greater than a threshold value from among pages of the first block and determine, as the read hot data, data stored in at least one page corresponding to a second word line adjacent to the first word line.

According to some aspects of the inventive concepts, there is provided a storage device including a non-volatile memory including a single level cell (SLC) block and a multi level cell (MLC), wherein the SLC block and the MLC block each includes word lines stacked in a direction vertical to a substrate and a first string select line and a second string select line adjacent to each other in a horizontal direction; and a storage controller configured to, during a read reclaim operation on the MLC block, determine read hot data from among a plurality of pieces of data stored in the MLC block and write the read hot data in the SLC block. During the read reclaim operation, the storage controller is configured to select a first page and a second page each having numbers of error bits equal to or greater than a threshold value and corresponding to the first string select line in the MLC block, and determine, as the read hot data, data stored in at least one page that corresponds to the second string select line and a third word line, the third word line at a third vertical level between a first vertical level of the first word line, which corresponds to the first page, and a second word line, which corresponds to the second page, and a second vertical level of the second string select line.

According to some aspects of the inventive concepts, there is provided an operating method of a storage controller configured to control a non-volatile memory, the operating method including: during a read reclaim operation on a source block from among a plurality of memory blocks included in the non-volatile memory, performing a read operation on a plurality of pages of the source block; selecting from the plurality of pages a first page in which a number of error bits is equal to or greater than a threshold value; determining, as read hot data, data stored in at least one page of a second word line that is adjacent to a first word line corresponding to the selected first page; and writing the read hot data in a target block from among the memory blocks.

BRIEF DESCRIPTION OF THE DRAWINGS

Aspects of the present disclosure will be more clearly understood from the following detailed description taken in conjunction with the accompanying drawings in which:

FIG. 1 is a block diagram showing a storage system according to some embodiments of the inventive concepts;

FIG. 2 shows a table showing read hot data according to some embodiments of the inventive concepts;

DETAILED DESCRIPTION OF THE EMBODIMENTS

Figure 3:
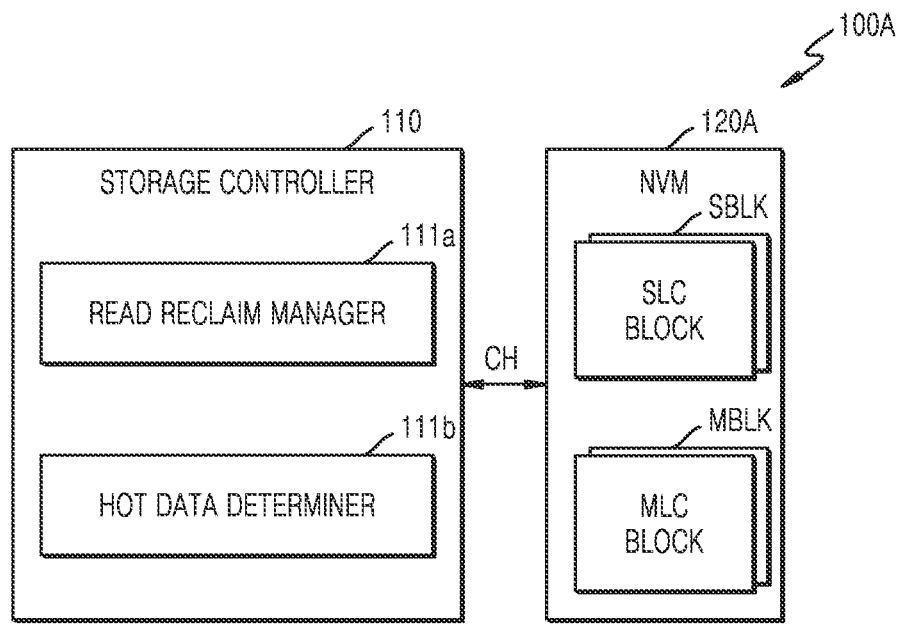
FIGS. 3 to 5 are diagrams showing storage devices according to some embodiments of the inventive concepts.

FIG. 1 is a block diagram showing a storage system 10 according to some embodiments of the inventive concept.

Referring to FIG. 1, the storage system 10 may include a storage device 100 and a host 200, and thus, the storage system 10 may be referred to as a host-storage system. The storage device 100 may include a storage controller 110 and a non-volatile memory (NVM) 120, and the storage controller 110 and the NVM 120 may be connected to each other through a channel CH. According to some embodiments, the storage controller 110 may be referred to as a controller, a device controller, or a memory controller, and referred to as such herein. According to some embodiments, the NVM 120 may be implemented with a plurality of memory chips or a plurality of memory dies. For example, the memory chips may each be a dual die package (DDP), a quadruple die package (QDP), or an octuple die package (ODP), with the present disclosure not limited thereto.

The host 200 may include a host controller 210 and a host memory 220. The host memory 220 may function as a buffer memory for temporarily storing data DATA to be transmitted to the storage device 100 (e.g., data to be written to the NVM 120) and/or data DATA transmitted from the storage device 100 (e.g., data read from the NVM 120). According to some embodiments, the host controller 210 may be one of a plurality of modules included in an application processor (AP), and the AP may be implemented as a system-on-chip (SoC). In some embodiments, the host memory 220 may be an embedded memory provided in the AP, while in other embodiments the host memory 220 may be a non-volatile memory or a memory module provided outside the AP.

When a request REQ received from the host 200 is a write request, the storage controller 110 may control the NVM 120 to write the data DATA to the NVM 120 in response to the write request from the host 200. Also, when the request REQ received from the host 200 is a read request, the storage controller 110 may control the NVM 120 to read the data DATA stored in the NVM 120 in response to the read request from the host 200. Therefore, the storage device 100 may include storage media for storing data DATA in response to the request REQ from the host 200. As an example, the storage device 100 may include at least one of a solid state drive (SSD), an embedded memory, and a removable external memory. For example, when the storage device 100 is an SSD, the storage device 100 may be a device that complies with the non-volatile memory express (NVMe) standard. For example, when the storage device 100 is an embedded memory or an external memory, the storage device 100 may be a device that complies with the universal flash storage (UFS) standard or the embedded multi-media card (eMMC) standard. The host 200 and the storage device 100 may generate and transmit packets according to standard protocols employed thereby, respectively.

The NVM 120 may include a plurality of memory blocks including a first block 121a and a second block 121b. The first block 121a may include first memory cells each storing N-bit data, and the NVM 120 may include a plurality of first blocks 121a each including N-bit first memory cells. The second block 121b may include second memory cells each storing M-bit data, and the NVM 120 may include a plurality of second blocks 121b each including M-bit second memory cells. Here, N and M are positive integers, and N may be greater than M. According to some embodiments, the first block 121a may be referred to as an N-bit block, and the second block 121b may be referred to as an M-bit block.

As such, bit densities of the first block 121a and the second block 121b may be different from each other. Here, the term "bit density" may refer to the number of bits stored per unit area. Read speed of each of the first block 121a and the second block 121b may be inversely correlated with the bit density thereof. Accordingly, read speeds of the first block 121a and the second block 121b may be different from each other. For example, the first block 121a may have a relatively high or higher bit density, and thus, a read speed of the first block 121a may be relatively slow or slower. For example, the second block 121b may have a relatively low or lower bit density, and thus, a read speed of the second block 121b may be relatively fast or faster. Data reliability may also be inversely correlated with the bit density. As such, the data reliability of the first blocks 121a may be relatively low or lower, and the data reliability of the second blocks 121b may be relatively high or higher.

The storage controller 110 may be configured to determine read hot data from among a plurality of pieces of data stored in the first block 121a during a read reclaim operation on the first block 121a having a relatively high bit density, and write the determined read hot data in the second block 121b having a relatively low bit density. In greater detail, during the read reclaim operation, the storage controller 110 may select a first word line corresponding to a first page in which a number of error bits is equal to or greater than a threshold value from among pages of the first block 121a, and may determine data stored in at least one page corresponding to a second word line adjacent to the first word line as the read hot data.

Here, the "read reclaim operation" may refer to an operation of moving data in a source region (e.g., a source block) to another target region or a destination region (e.g., a target block or a destination block) and erasing the data in the source region to re-use the source region. In greater detail, valid data stored in the source region may be read, and the read valid data may be programmed in another target region. Therefore, an address corresponding to the valid data in a mapping table may be changed from an address of a source region to an address of a target region.

The storage controller 110 may include a read reclaim manager 111a and a hot data determiner 111b. According to some embodiments, the read reclaim manager 111a and the hot data determiner 111b may be implemented in software, firmware, and/or hardware. Various implementation examples of the read reclaim manager 111a and the hot data determiner 111b are described below with reference to FIGS. 11 to 13.

The read reclaim manager 111a may manage a read reclaim operation on the NVM 120. In greater detail, when the number of error bits in read data due to a read operation on the NVM 120 is greater than a threshold value, the read reclaim manager 111a may move the entire data of the memory block that includes memory cells having the read data stored therein to another memory block. In some embodiments, some of the data of the memory block storing the read data may be moved to the other memory block. In other words, to maintain the reliability of data that may exceed the error correction capability of an ECC engine (114 of FIG. 11), the read reclaim manager 111a may move read data having a larger or greater number of error bits than a threshold value to another memory block.

The read reclaim manager 111a may manage a read reclaim table that includes information regarding the number of error bits for each of a plurality of memory blocks included in the NVM 120 and an error bit increasing rate. Also, the read reclaim manager 111a may periodically or aperiodically update information stored in the read reclaim table. For example, the read reclaim manager 111a may update information stored in the read reclaim table when a read operation on the NVM 120 occurs.

In some embodiments, the read reclaim table may be stored in the NVM 120, and may be loaded into the storage controller 110 when power is applied to the storage device 100. For example, the read reclaim table may be stored in the NVM 120, and some information in the read reclaim table may be loaded into the storage controller 110 during runtime of the storage device 100. The storage controller 110 may periodically or aperiodically store a read reclaim table in the NVM 120.

The read reclaim manager 111a may group a plurality of memory blocks into a plurality of groups according to the numbers of error bits and/or error bit increasing rates. For example, the read reclaim manager 111a may classify memory blocks having error bit increasing rates that are greater than a threshold value as wear blocks and may classify memory blocks having error bit increasing rates that are equal to or less than the threshold value as normal blocks. As another example, the read reclaim manager 111a may classify memory blocks having error bit increasing rates that are greater than a first threshold value as weak blocks, may classify memory blocks having error bit increasing rates that are equal to or less than the first threshold value and greater than a second threshold value as normal blocks, and may classify memory blocks having error bit increasing rates that are less than or equal to the second threshold value as strong blocks. However, the inventive concepts are not limited thereto, and the read reclaim manager 111a may group a plurality of memory blocks into four or more groups according to various criteria, or may group a plurality of memory blocks using different classification criteria than the numbers of error bits and/or error bit increasing rates.

In some embodiments, the read reclaim manager 111a may manage a read reclaim operation on the NVM 120 through a random interval neighbor check (RINC). Here, RINC may refer to performing a dummy read operation in a variable unit. For example, a first dummy read operation may be performed after an interval in which a read count is 100, a second dummy read operation may be performed after an interval in which a read count is 250, and a third dummy read operation may be performed after an interval in which a read count is 300, as non-limiting examples.

In greater detail, the read reclaim manager 111a may monitor error bits of pages that correspond to an adjacent word line that is adjacent to a selected word line and, when the number of error bit is greater than a threshold value, may copy valid data of a corresponding block, and may program the copied data in a new block. In this case, the read reclaim manager 111a may perform a dummy read operation on at least one adjacent word line in a variable unit or perform a dummy read operation on at least one open word line in a variable unit through a RINC. Herein, an open word line may refer to an unselected word line on which a program operation is not performed.

The hot data determiner 111b may determine read hot data based on a read reclaim table during a read reclaim operation of one of a plurality of memory blocks. For example, during a read reclaim operation on the first block 121a, the hot data determiner 111b may select a first word line that corresponds to a first page in which the number of error bits is equal to or greater than a threshold value from among pages of the first block 121a and may determine, as read hot data, data stored in at least one page corresponding to a second word line that is adjacent to the first word line. More detailed descriptions thereof are given below with reference to FIG. 2.

FIG. 2 shows a table 21 showing read hot data according to some embodiments of the inventive concepts.

Referring to FIGS. 1 and 2 together, the table 21 may store the number of error bits for each address. Here, an address may correspond to an address of a physical unit PU, and the physical unit may be a word line or a page. For example, addresses A to J may correspond to physical units physically adjacent to one another, respectively. Therefore, different addresses may correspond to different word lines or different pages, respectively. For example, an address may correspond to a word line number (WLN) or a physical page number (PPN). The table 21 of FIG. 2 may correspond to a read reclaim table managed by the read reclaim manager 111a.

As seen in the example of FIG. 2, the numbers of error bits corresponding to addresses B and D may be the largest ones from among those corresponding to a plurality of addresses. At this time, the hot data determiner 111b may select a first word line corresponding to an address B and a third word line corresponding to an address D, and may determine data stored at the address C between the first word line and the third word line as read hot data.

The term "read hot data" may refer to data for which a read request is frequently generated. When data stored at a particular page (e.g., the address C) is intensively read, a read disturb issue or read disturbance issue may occur for word lines (e.g., the first word line and the third word line) adjacent to a word line (e.g., a second word line) corresponding to the corresponding page. Therefore, the numbers of error bits in data stored in pages corresponding to the first word line and the third word line may rapidly increase, and an error bit increasing rate may increase.

The storage controller 110 may control the NVM 120 to store read hot data determined during a read reclaim operation on the first block 121a in the second block 121b. As described above, because the data reliability of the second block 121b is higher than that of the first block 121a, the overall read reliability of the NVM 120 may be improved by moving the read hot data stored in the first block 121a to the second block 121b.

According to the above-described embodiment, because the hot data determiner 111b may determine read hot data during a read reclaim operation, it is not necessary to separately provide a counter for managing read counts, and such a counter may be omitted. Also, read hot data may be determined by utilizing read data received by a read operation performed during a read reclaim operation (e.g., a copy read operation) without performing a separate read operation for determining read hot data, and thus, read hot data may be more efficiently determined as compared to other methods.

Also, the table 21 may store a physical strength for each address. Physical units may have physical strengths different from one another due to process variations. For example, a physical strength may include retention strength. Here, it may be defined that the "retention strength" corresponds to a time that the physical unit PU retains data before a reclaim operation on the physical unit PU is needed.

According to some embodiments, the storage controller 110 may classify physical units of respective addresses into strong physical units or weak physical units based on physical strengths of the physical units. However, the inventive concepts are not limited thereto, and physical units may be classified into three or more groups based on physical strengths of the physical units according to addresses. For example, in some embodiments physical units may be classified into strong physical units, normal physical units, or weak physical units according to addresses.

In some embodiments, the hot data determiner 111b may determine read hot data based on the number of error bits and physical strength of each address. For example, the numbers of error bits corresponding to an address H, an address I, and an address J may be relatively high, but the address H, the address I, and the address J may correspond to weak physical units. Therefore, the hot data determiner 111*b* may determine that no intense read operation has been performed on word lines adjacent to the address H, the address I, and the address J despite the numbers of error bits of the address H, the address I, and the address J and may not determine data that is stored in pages that correspond to the corresponding word lines as read hot data.

Therefore, during a read reclaim operation on the first block 121*a*, the storage controller 110 may not move data corresponding to page corresponding to the word lines adjacent to the address H, the address I, and the address J to the second block 121*b*. Accordingly, because the number of unnecessary program and erase operations on the NVM 120 may be reduced, the performance of the NVM 120 and the storage device 100 including the same may be improved.

Also, when a write request is received from the host 200, the storage controller 110 may determine the hotness of data based on a logical address included in the write request and may allocate a memory block having a relatively low bit density as a storage space for hot data of which the hotness is greater than a threshold value. For example, the storage controller 110 may control the NVM 120 to write hot data to the second block 121*b*.

FIG. 3 is a diagram showing a storage device 100A according to some embodiments of the inventive concepts.

Referring to FIG. 3, the storage device 100A corresponds to an example of the storage device 100 of FIG. 1, and NVM 120A may include single level cell (SLC) blocks SBLK and multi-level cell (MLC) blocks MBLK. Memory cells included in each SLC block SBLK may each store 1-bit data. Memory cells included in each MLC block MBLK may each store 2-bit data. The read speed of the SLC blocks SBLK may be faster than the read speed of the MLC blocks MBLK.

During a read reclaim operation on an MLC block MBLK, the storage controller 110 may determine read hot data among a plurality of pieces of data stored in the MLC block MBLK and write the determined read hot data in an SLC block SBLK. Here, because the data reliability of the SLC blocks SBLK is relatively higher than that of the MLC blocks MBLK, the read reliability of the storage device 100A may be improved.

Figure 4:
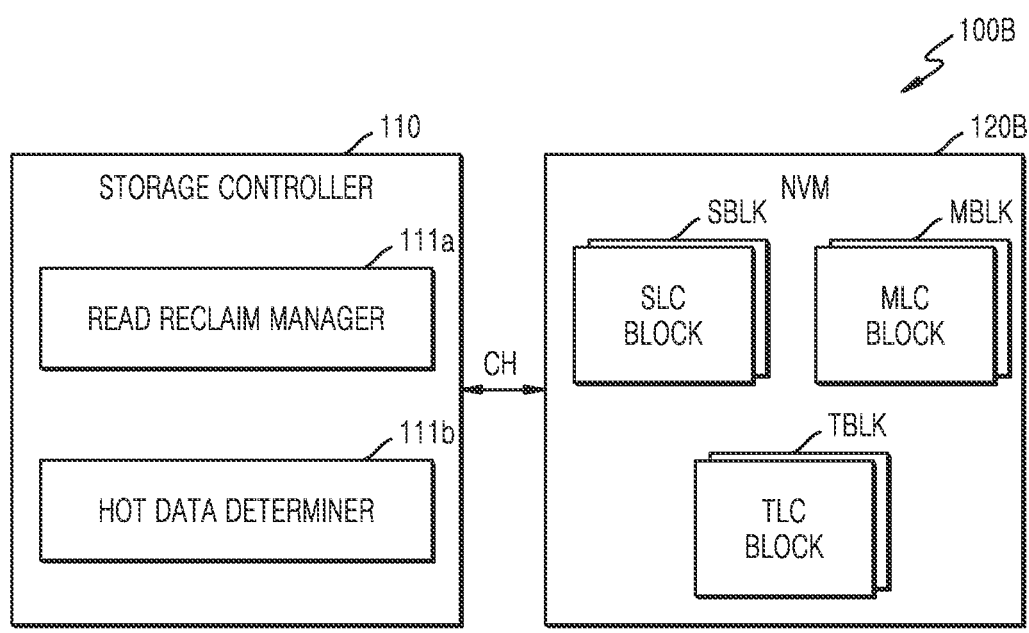

FIG. 4 is a diagram showing a storage device 100B according to some embodiments of the inventive concepts.

Referring to FIG. 4, the storage device 100B may correspond to an example of the storage device 100 of FIG. 1, and an NVM 120B may include SLC blocks SBLK, MLC blocks MBLK, and triple level cell (TLC) blocks TBLK. Memory cells included in each SLC block SBLK may each store 1-bit data. Memory cells included in each MLC block MBLK may each store 2-bit data. Memory cells included in each TLC block TBLK may each store 3-bit data. The read speed of the SLC blocks SBLK may be faster than the read speed of the MLC blocks MBLK and the read speed of the TLC blocks TBLK, and the read speed of the MLC blocks MBLK may be faster than the read speed of the TLC blocks TBLK.

According to some embodiments, during a read reclaim operation on an MLC block MBLK, the storage controller 110 may determine read hot data from among a plurality of pieces of data stored in the MLC block MBLK and write the determined read hot data in an SLC block SBLK. Here, because the data reliability of the SLC blocks SBLK is higher than that of the MLC blocks MBLK, the read reliability of the storage device 100B may be improved.

According to some embodiments, during a read reclaim operation on a TLC block TBLK, the storage controller 110 may determine read hot data from among a plurality of pieces of data stored in the TLC block TBLK and write the determined read hot data in an MLC block MBLK or an SLC block SBLK. Here, because the data reliability of the SLC blocks SBLK is higher than the data reliability of the MLC blocks MBLK and the TLC blocks TBLK, and the data reliability of the MLC blocks MBLK is higher than that of the TLC blocks TBLK, the read reliability of the storage device 100B may be improved.

Figure 5:
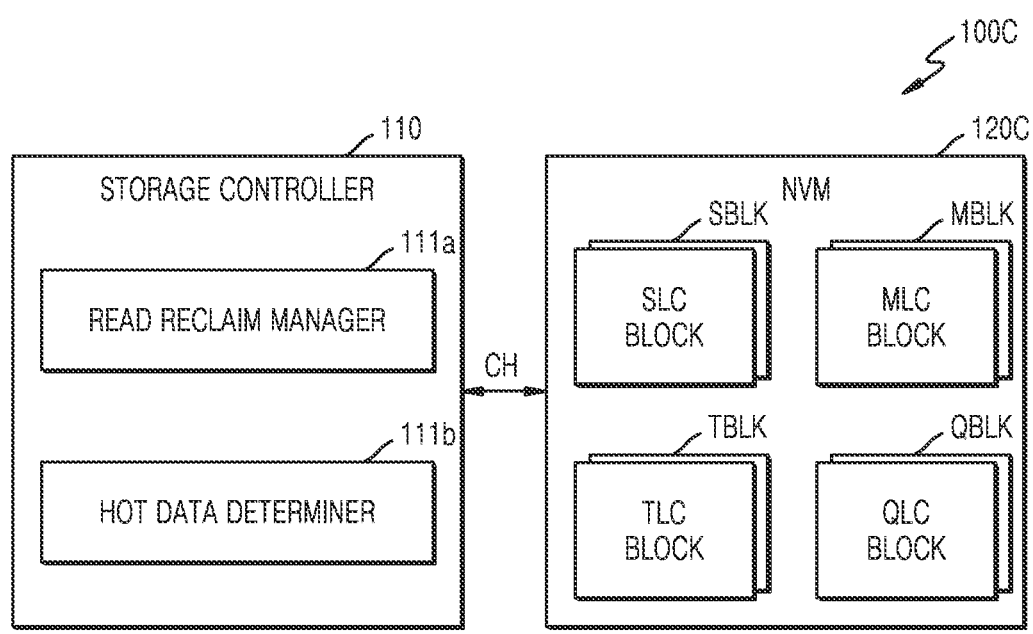

FIG. 5 is a diagram showing a storage device 100C according to some embodiments of the inventive concept.

Referring to FIG. 5, the storage device 100C may correspond to an example of the storage device 100 of FIG. 1, and an NVM 120C may include SLC blocks SBLK, MLC blocks MBLK, TLC blocks TBLK, and quadruple level cell (QLC) blocks QBLK. Memory cells included in each SLC block SBLK may each store 1-bit data. Memory cells included in each MLC block MBLK may each store 2-bit data. Memory cells included in each TLC block TBLK may each store 3-bit data. Memory cells included in each QLC block QBLK may each store 4-bit data. The read speed of the SLC blocks SBLK may be faster than the read speed of the MLC blocks MBLK, the read speed of the TLC blocks TBLK, and the read speed of the QLC blocks QBLK. The read speed of the MLC blocks MBLK may be faster than the read speed of the TLC blocks TBLK and the read speed of the QLC blocks QBLK. The read speed of the TLC blocks TBLK may be faster than the read speed of the QLC blocks QBLK.

According to some embodiments, during a read reclaim operation on an MLC block MBLK, the storage controller 110 may determine read hot data from among a plurality of pieces of data stored in the MLC block MBLK and write the determined read hot data in an SLC block SBLK. Here, because the data reliability of the SLC blocks SBLK is higher than that of the MLC blocks MBLK, the read reliability of the storage device 100C may be improved.

According to some embodiments, during a read reclaim operation on a TLC block TBLK, the storage controller 110 may determine read hot data from among a plurality of pieces of data stored in the TLC block TBLK and write the determined read hot data in an MLC block MBLK or an SLC block SBLK. Here, because the data reliability of the SLC blocks SBLK is higher than the data reliability of the MLC blocks MBLK and the TLC blocks TBLK, and the data reliability of the MLC blocks MBLK is higher than that of the TLC blocks TBLK, the read reliability of the storage device 100C may be improved.

According to some embodiments, during a read reclaim operation on a QLC block QBLK, the storage controller 110 may determine read hot data from among a plurality of pieces of data stored in the QLC block QBLK and write the determined read hot data in a TLC block TLBK, an MLC block MBLK, or an SLC block SBLK. Here, because the data reliability of the SLC blocks SBLK is higher than the data reliability of the MLC blocks MBLK, the TLC blocks TBLK, and the QLC blocks QBLK, the data reliability of the MLC blocks MBLK is higher than the data reliability of the TLC blocks TLBK and the QLC blocks QBLK, and the data reliability of the TLC blocks TBLK is higher than the data reliability of the QLC blocks QBLK, the read reliability of the storage device 100C may be improved.

Figure 6:
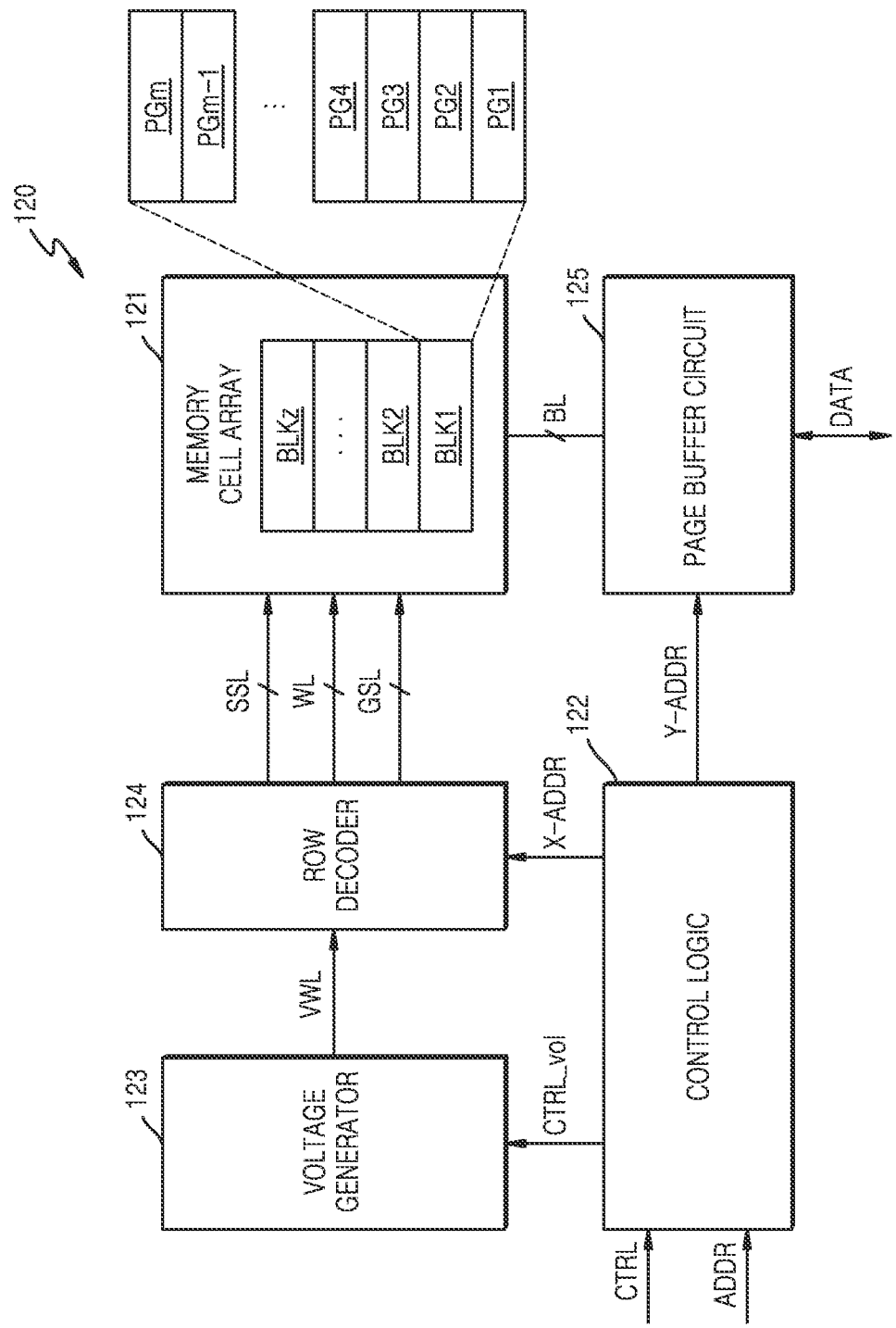
FIG. 6 is a block diagram showing a non-volatile memory according to some embodiments of the inventive concepts.

FIG. 6 is a block diagram showing the NVM 120 according to some embodiments of the inventive concepts.

Referring to FIG. 6, the NVM 120 may include a memory cell array 121, a control logic circuit 122, a voltage generator 123, a row decoder 124, and a page buffer circuit 125. Although not shown in FIG. 6, the NVM 120 may further include a memory interface circuit and may further include column logic, a pre-decoder, a temperature sensor, a command decoder, an address decoder, and/or other components.

The memory cell array 121 may include a plurality of memory blocks BLK1 to BLKz, and the memory blocks BLK1 to BLKz may each include a plurality of pages PG1 to PGm, wherein z and m may be positive integers and may vary according to different embodiments. In some embodiments, a memory block may be an erase unit, and a page may be a write/read unit. As an example, the memory blocks BLK1 to BLKz may include the memory blocks BLKa and BLKb of FIG. 1. The memory cell array 121 may be connected to the page buffer circuit 125 through bit lines BL, and may be connected to the row decoder 124 through word lines WL, string select lines SSL, and ground select lines GSL.

According to some embodiments, and as discussed above, the physical unit PU may be a word line or a page, and a word line may correspond to at least one page. For example, when memory cells are SLCs, a word line may correspond to one page. For example, when memory cells are MLCs, a word line may correspond to two pages. For example, when memory cells are TLCs, a word line may correspond to three pages. For example, when memory cells are QLCs, a word line may correspond to four pages.

In some embodiments, the memory cell array 121 may include a 3-dimensional memory cell array, and the 3-dimensional memory cell array may include a plurality of NAND strings. Each NAND string may include memory cells connected to word lines vertically stacked on a substrate, respectively. Examples are described in U.S. Pat. Nos. 7,679,133, 8,553,466, 8,654,587, 8,559,235, and U.S. Patent Application Publication No. 2011/0233648, each of which is incorporated by reference herein in its entirety. A 3-dimensional memory cell array is described in more detail with reference to FIG. 7.

In some embodiments, the memory cell array 121 may include a 2-dimensional memory cell array, and the 2-dimensional memory cell array may include a plurality of NAND strings arranged in row-wise directions and column-wise directions. A 2-dimensional memory cell array is described in more detail with reference to FIG. 8. In some embodiments, the memory cell array 121 may include various other types of non-volatile memories, and thus, the NVM 120 may include magnetic RAM (MRAM), spin-transfer torque MRAM, conductive bridging RAM (CBRAM), ferroelectric RAM (FeRAM), phase change RAM (PRAM), resistive RAM, and/or various other types of memories.

The control logic circuit 122 may overall control various operations in the NVM 120. The control logic circuit 122 may output various control signals in response to a command CMD and/or an address ADDR. For example, the control logic circuit 122 may output a voltage control signal CTRL_vol, a row address X_ADDR, and a column address Y_ADDR. The voltage generator 123 may generate various types of voltages for performing a program operation, a read operation, and/or an erase operation, based on the voltage control signal CTRL_vol. For example, the voltage generator 123 may generate a program voltage, a read voltage, a program verify voltage, or an erase voltage as a word line voltage VWL.

The row decoder 124 may select one from among the word lines WL in response to a row address X_ADDR and may select one from among the string select lines SSL. For example, the row decoder 124 may apply a program voltage and a program verify voltage to a selected word line WL during a program operation, and may apply a read voltage to a selected word line WL during a read operation. The page buffer circuit 125 may select at least one bit line BL from among the bit lines BL in response to a column address Y_ADDR. The page buffer circuit 125 may operate as a write driver or a sense amplifier depending on an operation mode.

Figure 7:
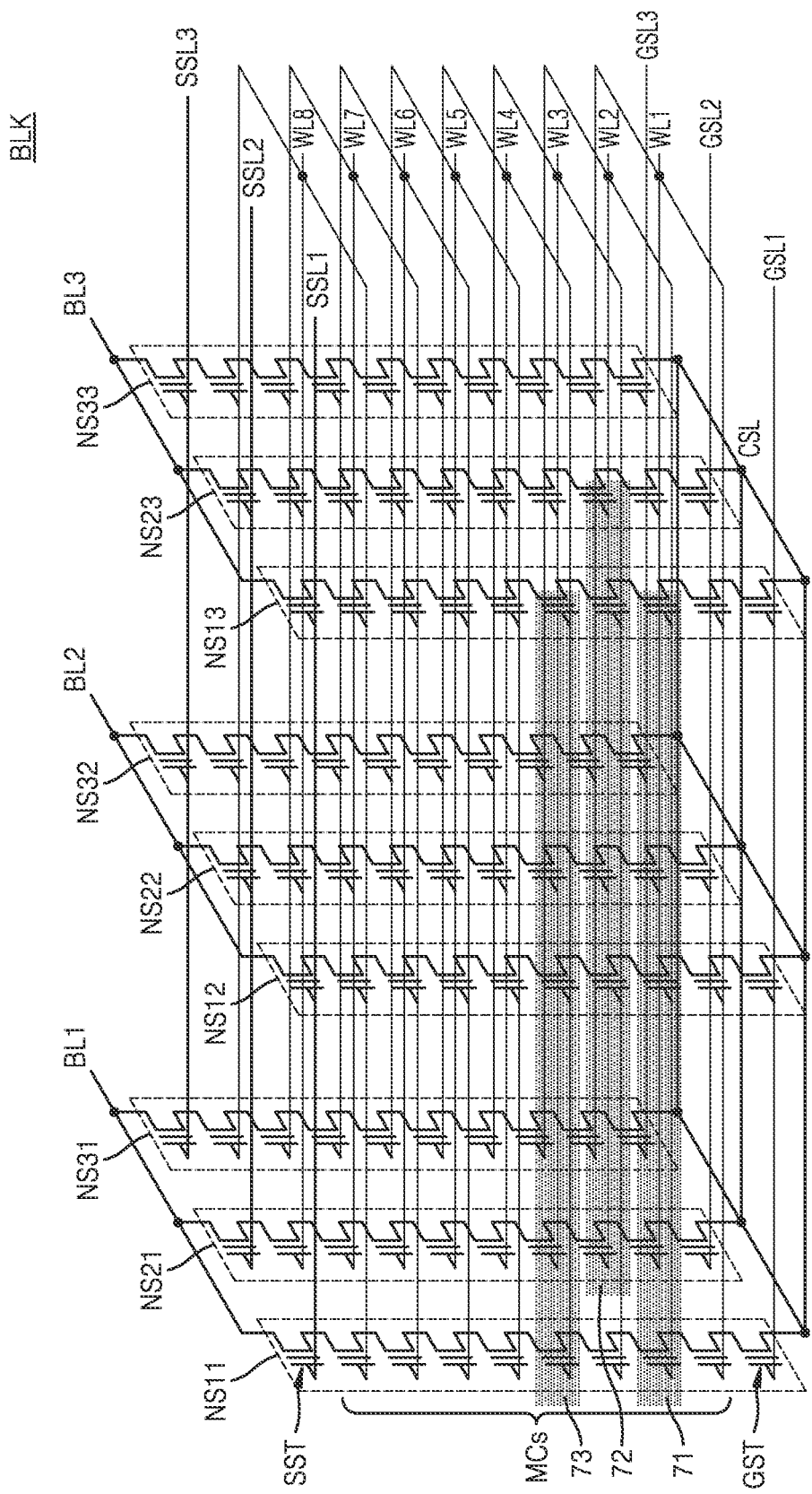
FIGS. 7 and 8 are circuit diagrams showing a memory block according to some embodiments of the inventive concepts.

FIG. 7 is a circuit diagram showing a memory block BLK according to some embodiments of the inventive concepts.

Referring to FIG. 7, the memory block BLK may be a NAND flash memory having a vertical structure and may correspond to one of the memory blocks BLK1 to BLKz of FIG. 6. The memory block BLK may include NAND strings NS11 to NS33, and each NAND string (e.g., NS11) may include a string select transistor SST, a plurality of memory cells MCs, and a ground select transistor GST connected in series. The string select transistor SST, the ground select transistor GST, and the memory cells MCs included in each NAND string may form a stacked structure on a substrate in a vertical direction.

Bit lines BL1 to BL3 may extend in a first direction, and word lines WL1 to WL8 may extend in a second direction. NAND cell strings NS11, NS21, and NS31 may be provided between a first bit line BL1 and a common source line CSL, NAND cell strings NS12, NS22, and NS32 may be provided between a second bit line BL2 and the common source line CSL, and NAND cell strings NS13, NS23, and NS33 may be provided between a third bit line BL3 and the common source line CSL.

The string select transistor SST may be coupled to corresponding string select lines SSL1 to SSL3. The memory cells MCs may be respectively connected to corresponding word lines WL1 to WL8. The ground select transistor GST may be coupled to corresponding ground select lines GSL1 to GSL3. The string select transistors SST may be respectively connected to a corresponding bit line BL, and the ground select transistor GST may be connected to the common source line CSL. Here, the number of NAND strings, the number of word lines, the number of bit lines, the number of ground select lines, and the number of string select lines may vary according to different embodiments.

Referring to FIGS. 1 and 7 together, according to some embodiments, during a read reclaim operation on the memory block BLK, the number of error bits of a first page 71 connected to the second word line WL2 and a first string select line SSL1, and the number of error bits of a third page 73 connected to a fourth word line WL4 and the first string select line SSL1 may each be greater than a threshold value. The hot data determiner 111b may determine that read operations have been intensely performed on a second page 72 connected to a second string select line SSL2 adjacent to the first string select line SSL1 and a third word line WL3 between the second word line WL2 and the fourth word line WL4, and determine the data stored in the second page 72 as read hot data. For example, the first page 71 may correspond to the address B of FIG. 2, the second page 72 may correspond to the address C of FIG. 2, and the third page 73 may correspond to an address D of FIG. 2. However, the inventive concepts are not limited thereto, and the operation of the hot data determiner 111b may be variously changed according to different embodiments.

According to some embodiments, during a read reclaim operation on the memory block BLK, the numbers of error bits of the first page 71 connected to the second word line WL2 and the first string select line SSL1 and the third page 73 connected to the fourth word line WL4 and the first string select line SSL1 may be greater than a threshold value. The hot data determiner 111b may determine that read operations have been intensely performed on a page connected to the first string select line SSL1 and the third word line WL3 between the second word line WL2 and the fourth word line WL4, and determined the data stored in the corresponding page as read hot data.

According to some embodiments, during a read reclaim operation on the memory block BLK, the number of error bits of the first page 71 connected to the second word line WL2 and the first string select line SSL1 may be greater than a threshold value. For example, the hot data determiner 111*b* may determine that read operations have been intensely performed on a page connected to the first word line WL1, which is adjacent to the second word line WL2, and connected to the second string select line SSL2, which is adjacent to the first string select line SSL1, and determine the data stored in the corresponding page as read hot data. For example, the hot data determiner 111*b* may determine that read operations have been intensely performed on a page connected to the third word line WL3, which is adjacent to the second word line WL2, and connected to the second string select line SSL2, which is adjacent to the first string select line SSL1, and determine the data stored in the corresponding page as read hot data. For example, the hot data determiner 111*b* may determine that read operations have been intensely performed on a page connected to the first word line WL1, which is adjacent to the second word line WL2, and connected to the first string select line SSL1 and determine data stored in the corresponding page as read hot data. For example, the hot data determiner 111*b* may determine that read operations have been intensely performed on a page connected to the third word line WL3, which is adjacent to the second word line WL2, and connected to the first string select line SSL1 and determine the data stored in the corresponding page as read hot data.

According to some embodiments, during a read reclaim operation on the memory block BLK, the number of error bits of the third page 73 connected to the fourth word line WL4 and the first string select line SSL1 may be greater than a threshold value. For example, the hot data determiner 111*b* may determine that read operations have been intensely performed on a page connected to the third word line WL3, which is adjacent to the fourth word line WL4, and connected the second string select line SSL2, which is adjacent to the first string select line SSL1, and determine the data stored in the corresponding page as read hot data. For example, the hot data determiner 111*b* may determine that read operations have been intensely performed on a page connected to a fifth word line WL5, which is adjacent to the fourth word line WL4, and connected to the second string select line SSL2, which is adjacent to the first string select line SSL1, and determine the data stored in the corresponding page as read hot data. For example, the hot data determiner 111*b* may determine that read operations have been intensely performed on a page connected to the third word line WL3, which is adjacent to the fourth word line WL4, and connected to the first string select line SSL1 and determine data stored in the corresponding page as read hot data. For example, the hot data determiner 111*b* may determine that read operations have been intensely performed on a page connected to the fifth word line WL5, which is adjacent to the fourth word line WL4, and connected to the first string select line SSL1 and determine the data stored in the corresponding page as read hot data.

When read hot data is determined according to the various embodiments described above, the storage controller 110 may program the read hot data in a target memory block having a lower bit density than the memory block BLK and invalidate previous read hot data stored in the memory block BLK. Also, the storage controller 110 may manage a mapping table (e.g., 141 of FIG. 14) by updating a physical address corresponding to the read hot data from an address of the memory block BLK to an address of the target memory block.

Figure 8:
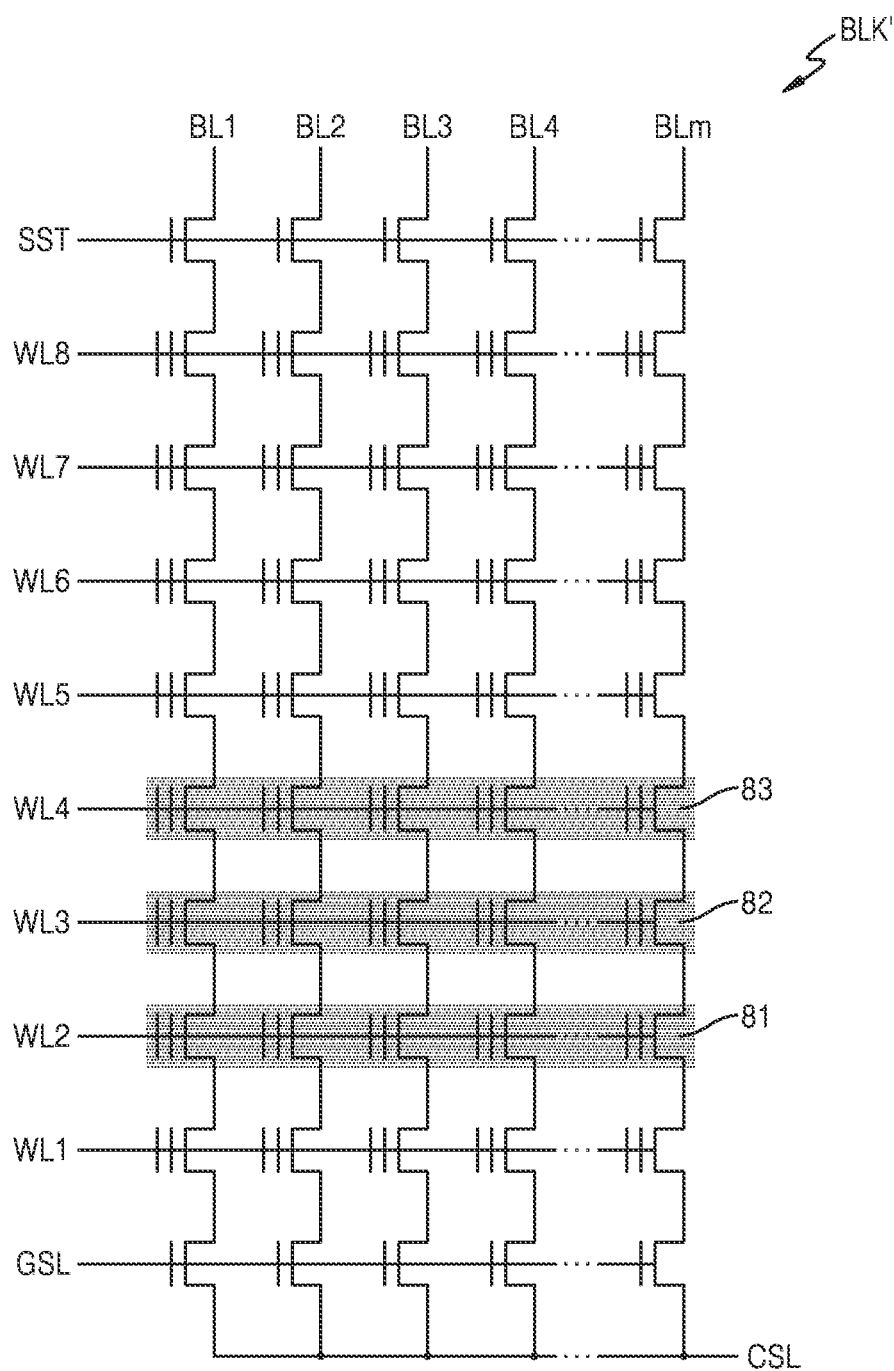

FIG. 8 is a circuit diagram showing a memory block BLK' according to some embodiments of the inventive concepts.

Referring to FIG. 8, the memory block BLK' may be a NAND flash memory having a horizontal structure and may correspond to one of the memory blocks BLK1 to BLKz of FIG. 6. The memory block BLK' may include word lines WL1 to WL8, bit lines BL1 to BLm, a ground select line GSL, a string select line SSL, and a common source line CSL. Here, the number of word lines, the number of bit lines, the number of ground select lines, and the number of string select lines may vary according to different embodiments.

Referring to FIGS. 1 and 8 together, according to some embodiments, during a read reclaim operation on the memory block BLK', the number of error bits of a first page 81 connected to the second word line WL2 and the number of error bits of a third page 83 connected to the fourth word line WL4 may each be greater than a threshold value. The hot data determiner 111*b* may determine that read operations have been intensely performed on a second page 82 connected to the third word line WL3 between the second word line WL2 and the fourth word line WL4 and determine the data stored in the second page 82 as read hot data. For example, the first page 81 may correspond to the address B of FIG. 2, the second page 82 may correspond to the address C of FIG. 2, and the third page 83 may correspond to an address D of FIG. 2. However, the inventive concepts are not limited thereto, and the operation of the hot data determiner 111*b* may be variously changed according to different embodiments.

According to some embodiments, during a read reclaim operation on the memory block BLK', the number of error bits of the first page 81 may be greater than the threshold value. For example, the hot data determiner 111*b* may determine that read operations have been intensely performed on a page connected to the first word line WL1 adjacent to the second word line WL2 and determine the data stored in the corresponding page as read hot data. For example, the hot data determiner 111*b* may determine that read operations have been intensely performed on a page connected to the third word line WL3 adjacent to the second word line WL2 and determine data stored in the corresponding page as read hot data.

According to some embodiments, during a read reclaim operation on the memory block BLK', the number of error bits of the third page 83 may be greater than the threshold value. For example, the hot data determiner 111*b* may determine that read operations have been intensely performed on a page connected to the third word line WL3 adjacent to the fourth word line WL4 and determine the data stored in the corresponding page as read hot data. For example, the hot data determiner 111*b* may determine that read operations have been intensely performed on a page connected to the fifth word line WL5 adjacent to the fourth word line WL4 and determine the data stored in the corresponding page as read hot data.

When read hot data is determined according to the various embodiments described above, the storage controller 110 may program the read hot data in a target memory block having a lower bit density than the memory block BLK' and invalidate previous read hot data stored in the memory block BLK'. Also, the storage controller 110 may manage a mapping table (e.g., 141 of FIG. 14) by updating a physical address corresponding to the read hot data from an address of the memory block BLK' to an address of the target memory block.

Figure 9:
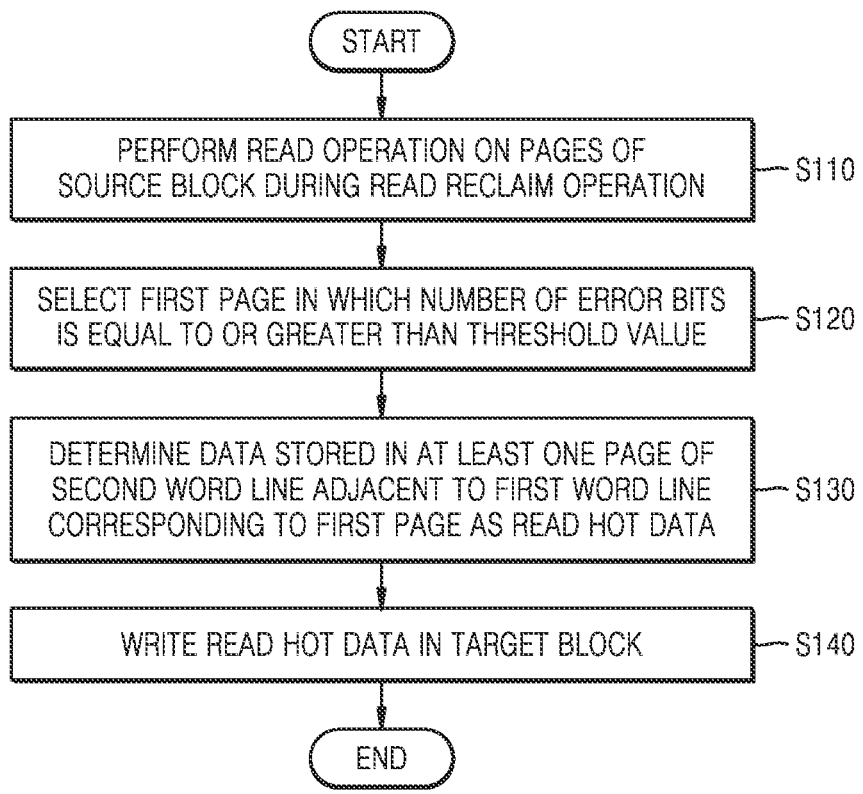
FIGS. 9 and 10 are flowcharts of an operating method of a storage controller according to some embodiments of the inventive concepts.

FIG. 9 is a flowchart of an operating method of a storage controller 110 according to some embodiments of the inventive concepts.

Referring to FIG. 9, in operation S110, the storage controller 110 may perform a read operation on pages of a source block during a read reclaim operation. In greater detail, the storage controller 110 may transmit an address indicating a source block and a read command to the NVM 120, and the NVM 120 may generate read data by performing a read operation on the source block. Next, the NVM 120 may transmit the read data resulting from the read operation to the storage controller 110.

In operation S120, the storage controller 110 may select, from the read data received from the NVM 120, a first page having a number of error bits that is equal to or greater than a threshold value. According to some embodiments, the threshold value may be changed dynamically. For example, the threshold value may be variably determined according to one or more of a temperature, the number of program/erase cycles of a memory block, a read count, an erase count, the number of errors, an error bit increasing rate, location information, etc. According to some embodiments, the threshold value may differ between one memory chip and another, or may differ between first and second memory blocks.

In operation S130, the storage controller 110 may determine data stored in at least one page of a second word line that is adjacent to a first word line corresponding to the first page as read hot data. Also, according to some embodiments, the storage controller 110 may select, from the read data received from the NVM 120, a second page in which the number of error bits is equal to or greater than the threshold value and determine, as read hot data, data that is stored in at least one page of the second word line, with the second word line between the first word line corresponding to the first page and a third word line corresponding to the second page.

In operation S140, the storage controller 110 may write the read hot data in a target block. In this case, the bit density of the target block may be less than the bit density of the source block, and thus, the data reliability of the target block may be higher than the data reliability of the source block. Therefore, the read reliability of the storage device 100 may be further improved through operations S110 to S140.

Figure 10:
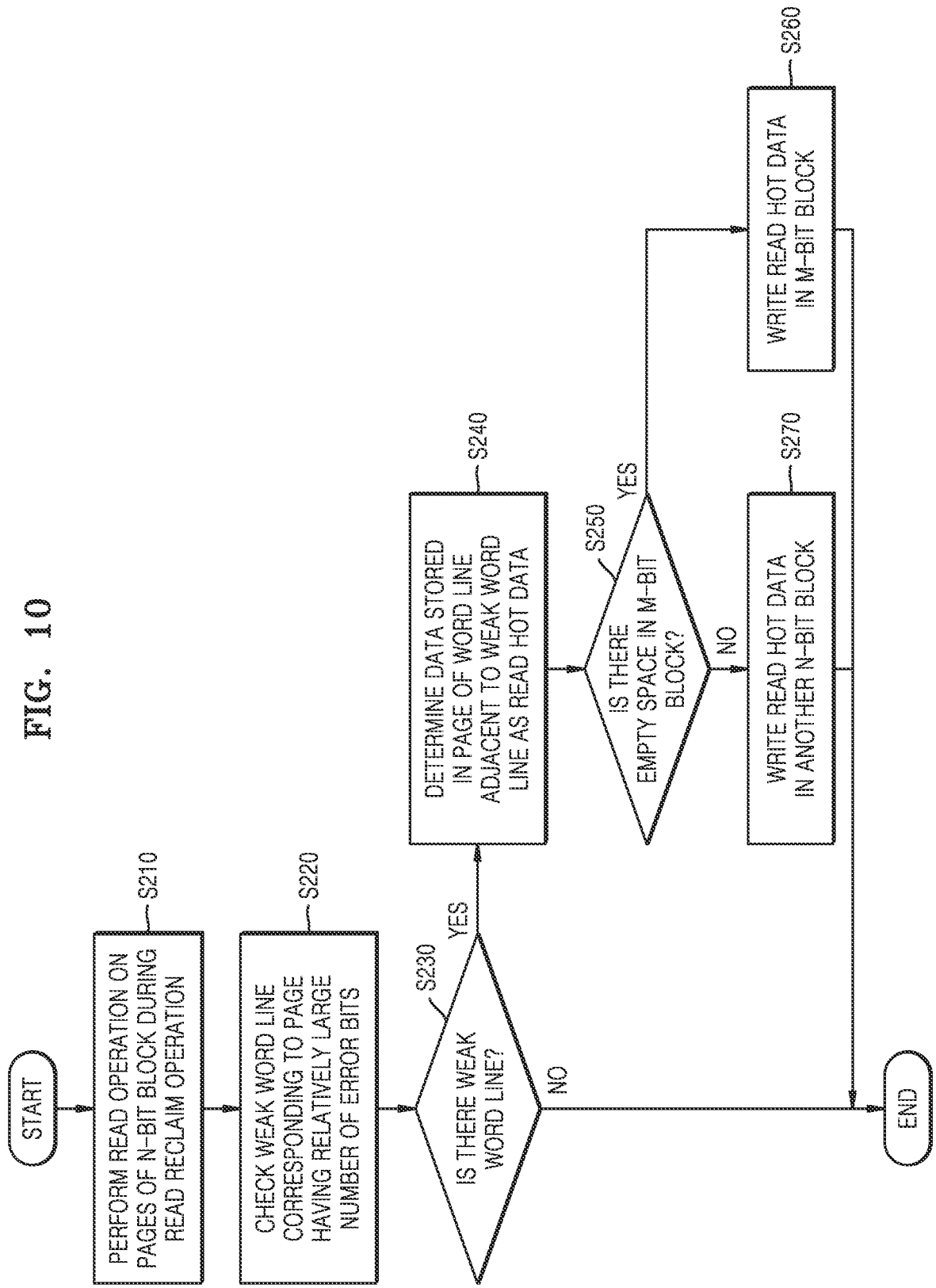

FIG. 10 is a flowchart of an operating method of a storage controller 110 according to some embodiments of the inventive concepts.

Referring to FIG. 10, in operation S210, the storage controller 110 may perform a read operation on pages of an N-bit block during a read reclaim operation. For example, the N-bit block may correspond to the first block 121*a* of FIG. 1. Here, N may be a positive integer equal to or greater than 2. In operation S220, the storage controller 110 may check a weak word line that corresponds to a page having a relatively high number of error bits in read data generated by the read operation. In operation S230, the storage controller 110 may determine whether there is a weak word line. When it is determined that there is a weak word line ("YES" branch of operation S230), operation S240 may be performed. Otherwise ("NO" branch of operations S230), the process may be terminated.

In operation S240, the storage controller 110 may determine data stored in a page of a word line that is adjacent to the weak word line as read hot data. In operation S250, the storage controller 110 may check whether there is an empty space in an M-bit block. For example, the M-bit block may correspond to the second block 121*b* of FIG. 1. M may be a positive integer less than N. When it is determined that there is an empty space in the M-bit block ("YES" branch from operation S250), in operation S260, the storage controller 110 may write the read hot data in the M-bit block. When it is determined there is no empty space in the M-bit block ("NO" branch from operation S250), in operation S270, the storage controller 110 may write the read hot data in a new N-bit block.

Figure 11:
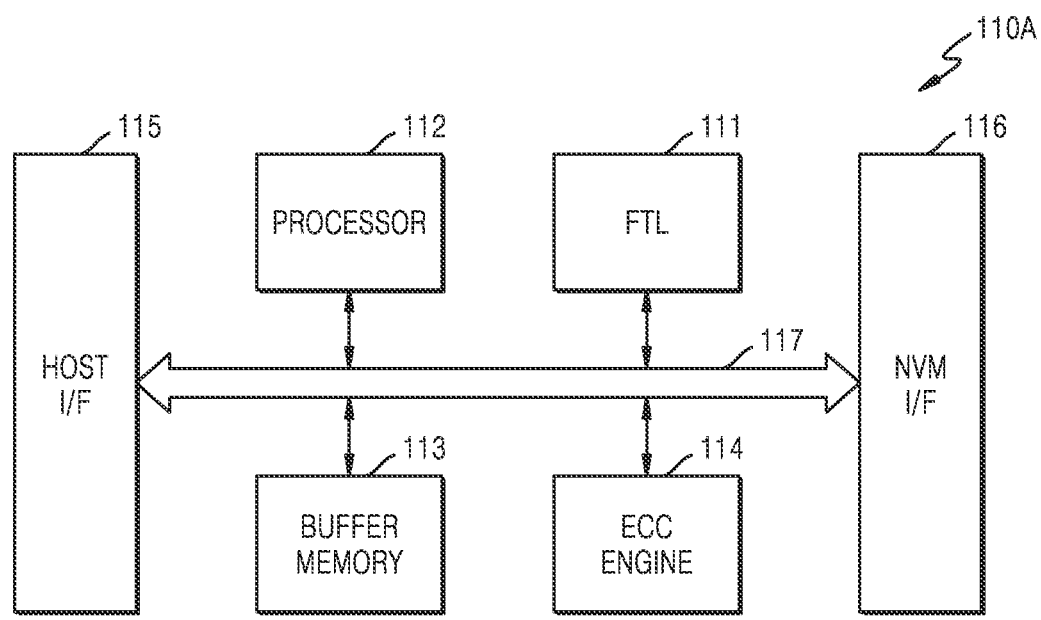
FIGS. 11 to 13 are diagrams showing storage controllers according to some embodiments of the inventive concepts.

FIG. 11 is a block diagram showing a storage controller 110A according to some embodiments of the inventive concepts in greater detail.

Referring to FIG. 11, the storage controller 110A may include a flash translation layer (FTL) 111, a processor 112, a buffer memory 113, an error correction code (ECC) engine 114, a host interface 115, and a non-volatile memory interface 116, which may communicate with one another through a bus 117. The storage controller 110A may further include a working memory (not shown) into which the FTL 111 may be loaded, and, as the processor 112 executes the FTL 111, a data write operation and a data read operation on the NVM 120 may be controlled. The storage controller 110A may correspond to an implementation example of the storage controller 110 of FIG. 1, and the storage controller 110A is described herein with reference to FIGS. 1 and 11 together.

The FTL 111 may perform various functions, such as address mapping, wear-leveling, and/or garbage collection. An address mapping operation may be an operation of changing a logical address received from the host 200 into a physical address used to actually store data in the NVM 120. For example, the FTL 111 may generate and continuously manage the mapping table 141 of FIG. 14 through address mapping. Wear-leveling may be a technique for preventing excessive degradation of a particular block by allowing memory blocks in the NVM 120 to be uniformly used and may be, for example, implemented through firmware technology for balancing erase counts of physical blocks. Garbage collection may be a technique for securing usable capacity in the NVM 120 by copying effective data of a memory block to a new block and then erasing the memory block.

According to some embodiments, the read reclaim manager 111*a* and the hot data determiner 111*b* of FIG. 1 may be implemented as portions of the FTL 111 of FIG. 11. Therefore, during a read reclaim operation on the first block 121*a* of the NVM 120, the FTL 111 may determine a read hot page from among pages of the first block 121*a* and may program the read hot page in the second block 121*b*.

The processor 112 may include a central processing unit (CPU) or a microprocessor and may control the overall operation of the storage controller 110A. In some embodiments, the processor 112 may be implemented as a multi-core processor, e.g., a dual-core processor or a quad-core processor. The buffer memory 113 may temporarily store data to be written to the NVM 120 and/or data read from the NVM 120. The buffer memory 113 may be a component provided in the storage controller 110A, but in some embodiments may be provided outside the storage controller 110A or provided both internal to and external of the storage controller 110A.

The ECC engine 114 may perform an error detection and correction function for read data that is read from the NVM 120. In greater detail, the ECC engine 114 may generate parity bits regarding program data to be programmed to the NVM 120, and such parity bits may be stored in the NVM 120 together with the program data. When data is read from the NVM 120, the ECC engine 114 may correct an error (if present) in the read data using parity bits read from the NVM 120 together with the read data, and may output the error-corrected read data.

The host interface 115 may transmit and receive packets to and from the host 200. A packet transmitted from the host 200 to the host interface 115 may include a command or data to be programmed to the NVM 120, and a packet transmitted from the host interface 115 to the host 200 may include a response to the command or data read from the NVM 120. The non-volatile memory interface 116 may transmit data to be written to the NVM 120 to the NVM 120 or receive data read from the NVM 120. In some embodiments, the non-volatile memory interface 116 may be implemented to comply with a standard protocol like Toggle or Open NAND Flash Interface (ONFI).

Figure 12:
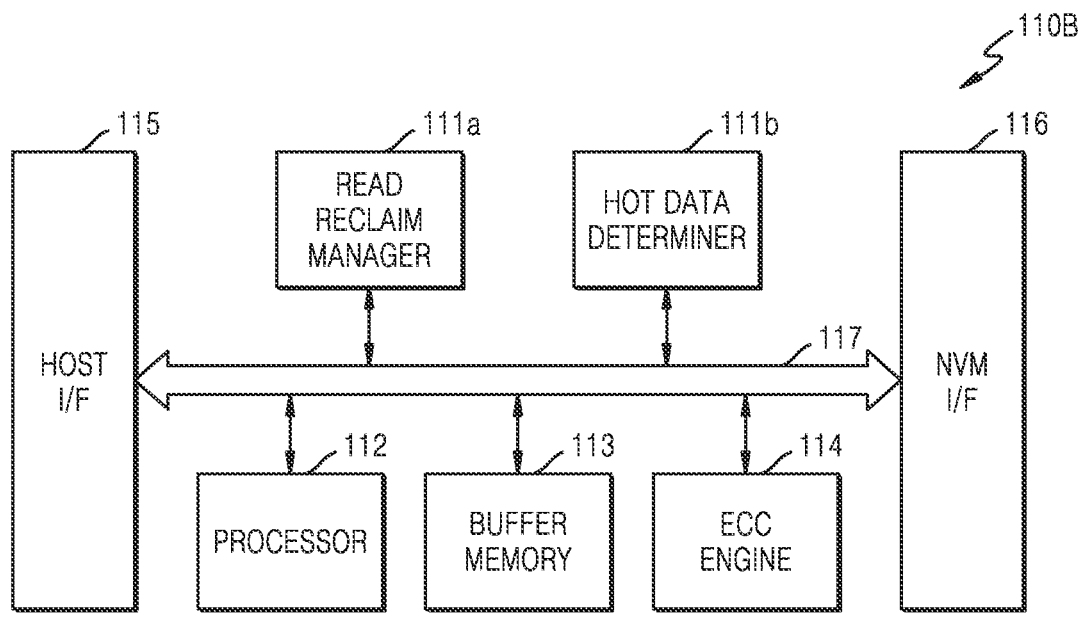

FIG. 12 is a block diagram showing a storage controller 110B according to some embodiments of the inventive concept in greater detail.

Referring to FIG. 12, the storage controller 110B may include the read reclaim manager 111a, a hot data determiner 111b, the processor 112, the buffer memory 113, the ECC engine 114, the host interface 115, and the non-volatile memory interface 116, which may communicate with one another through the bus 117. The storage controller 110B corresponds to a modified example of the storage controller 110A of FIG. 11, and thus, descriptions identical to those already given above are omitted in the interest of brevity.

In some embodiments, the read reclaim manager 111a and the hot data determiner 111b may be implemented in software. For example, the NVM 120 may store program code, and, when power is applied to the storage device 100, the program code stored in the NVM 120 may be loaded into a working memory of the storage controller 110. As described above with reference to FIGS. 1 to 10, during a read reclaim operation on the NVM 120, the processor 112 may perform functions of determining a read hot page from among the pages of the first block 121a and programming the read hot page in the second block 121b by executing the program code loaded into the working memory.

However, the inventive concepts are not limited thereto, and the read reclaim manager 111a and the hot data determiner 111b may be implemented in hardware. Also, in some embodiments, the read reclaim manager 111a and the hot data determiner 111b may be implemented as a combination of software and hardware. Furthermore, in some embodiments, at least one of the read reclaim manager 111a and the hot data determiner 111b may be implemented to be embedded in the non-volatile memory interface 116.

Figures 13, 14:
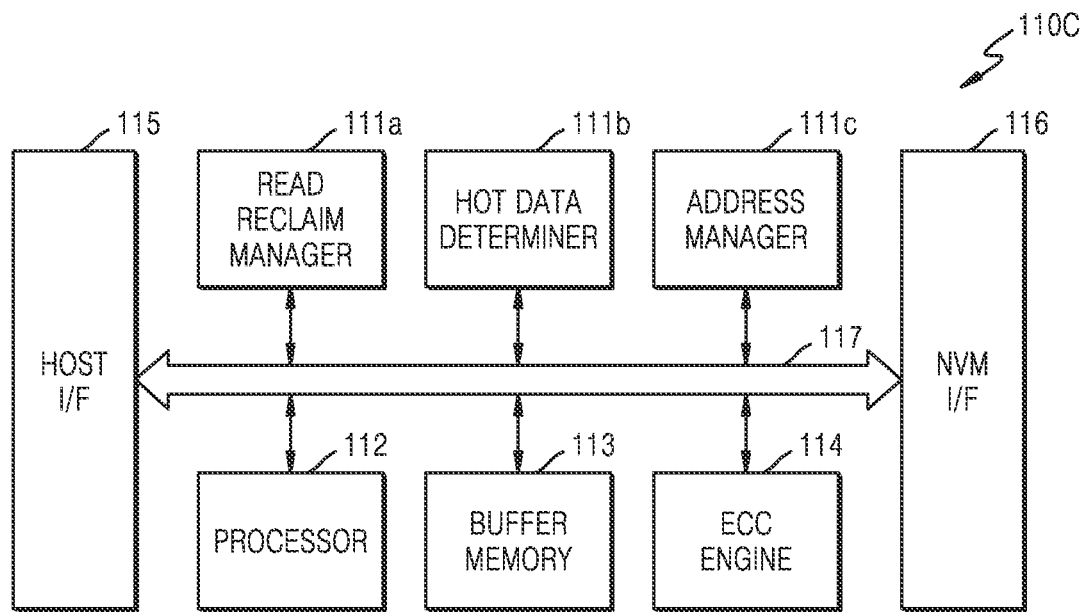
FIG. 14 is a flowchart of an operating method between a storage controller and a non-volatile memory (NVM) according to some embodiment of the inventive concepts.

FIG. 13 is a diagram showing a storage controller 110C according to some embodiments of the inventive concepts in greater detail.

Referring to FIG. 13, the storage controller 110C may include the read reclaim manager 111a, a hot data determiner 111b, an address manager 111c, the processor 112, the buffer memory 113, the ECC engine 114, the host interface 115, and the non-volatile memory interface 116, which may communicate with one another through the bus 117. The storage controller 110C corresponds to a modified example of the storage controller 110A of FIG. 11 and the storage controller 110B of FIG. 12, and thus, descriptions identical to those already given above are omitted herein in the interest of brevity.

According to some embodiments, the address manager 111c may update the physical address of a read hot page from an address of the first block 121a, which is a source block, to an address of the second block 121b, which is a target block, and may reflect the updated address in a mapping table. The operation of the address manager 111c is described in greater detail with reference to FIG. 14.

FIG. 14 is a diagram showing the mapping table 141 according to some embodiments of the inventive concepts.

Referring to FIGS. 1, 13, and 14 together, the mapping table 141 may store mapping data between logical addresses and physical addresses. For example, the mapping table 141 may store an initial physical address corresponding to a logical address, and may store an updated physical address corresponding to the same logical address. However, the inventive concepts are not limited thereto, and in some embodiments, when a physical address is changed in the mapping table 141, the physical address may be changed from an initial physical address to an updated physical address, and the mapping table 141 may store the updated physical address only. In other words, in some embodiments only the most up-to-date mapping data may be stored in the mapping table 141.

For example, when data corresponding to a third logical address LPN3 from among first to fourth logical addresses LPN1 to LPN4 is determined as read hot data, the read hot data may be moved from an initial physical address corresponding to a source region to an updated physical address corresponding to a target region. In this example, in the mapping table 141, a third physical address corresponding to the third logical address LPN3 may be updated from PPN3 to PPNc.

Figure 15:
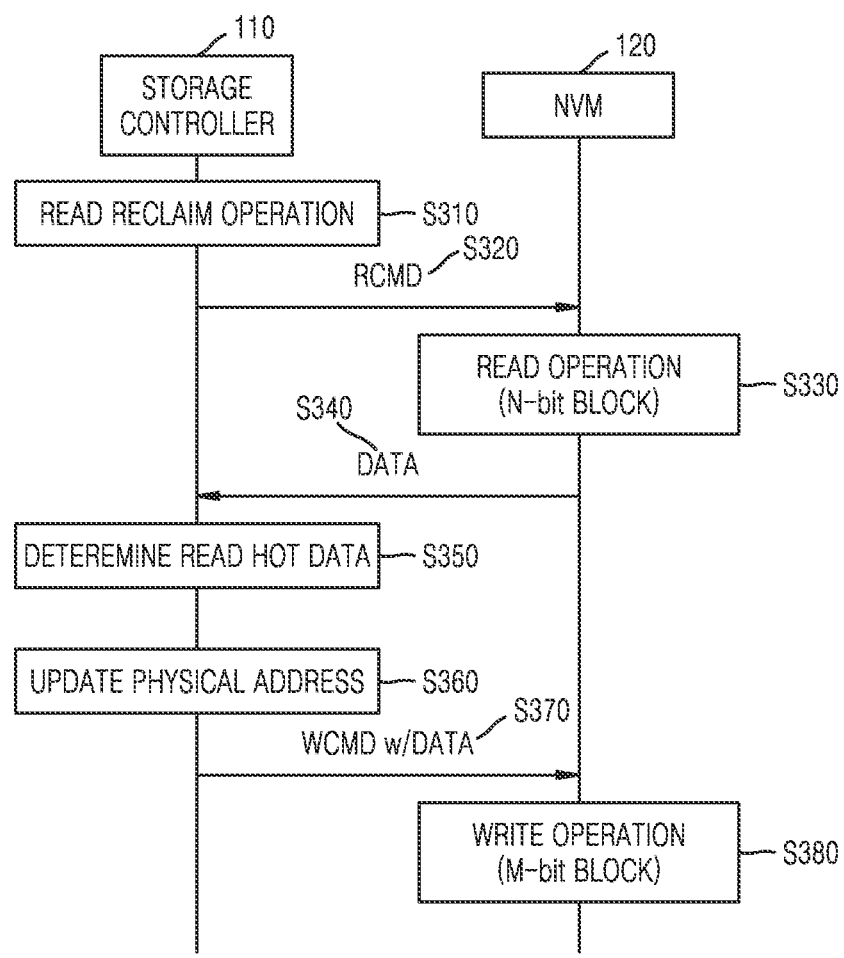
FIG. 15 is a diagram showing a mapping table according to some embodiments of the inventive concepts.

FIG. 15 is a flowchart of an operating method between the storage controller 110 and the NVM 120 according to some example embodiments of the inventive concepts.

Referring to FIGS. 1 and 15 together, in operation S310, the storage controller 110 may initiate a read reclaim operation. In operation S320, the storage controller 110 may transmit a read command RCMD to the NVM 120. For example, the read command RCMD may include a physical address corresponding to an N-bit block having a relatively high bit density (e.g., the first block 121a of FIG. 1). Here, N is a positive integer equal to or greater than 2. In operation S330, the NVM 120 may perform a read operation on the N-bit block. In operation S340, the NVM 120 may transmit read data to the storage controller 110.

In operation S350, the storage controller 110 may determine read hot data in the N-bit block from or based on a read result for the N-bit block. In operation S360, the storage controller 110 may update a physical address corresponding to the read hot data. In operation S370, the storage controller 110 may transmit a write command WCMD. For example, the write command WCMD may include a physical address corresponding to an M-bit block having a relatively low bit density (e.g., the second block 121b of FIG. 1). In operation S380, the NVM 120 may perform a write operation on the M-bit block. Here, M is a positive integer less than N.

Figure 16:
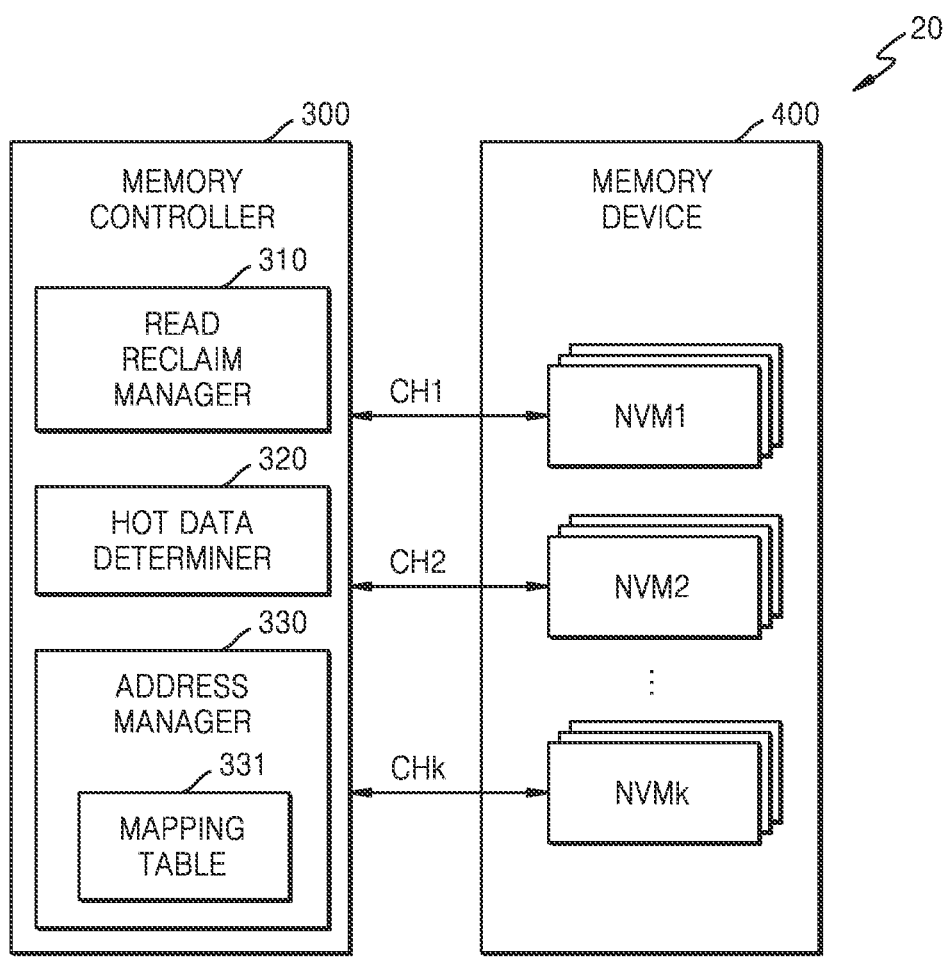
FIG. 16 is a block diagram showing a storage device according to some embodiments of the inventive concepts.

FIG. 16 is a block diagram showing a storage device 20 according to some embodiments of the inventive concepts.

Referring to FIG. 16, the storage device 20 may include a memory controller 300 and a memory device 400. The storage device 20 may support a plurality of channels CH1 to CHk, and the memory device 400 and the memory controller 300 may be connected through the channels CH1 to CHk (here, k is a positive integer). The memory controller 300 may control the overall operation of the memory device 400. The memory controller 300 may control each of non-volatile memory devices NVM1, NVM2, and NVMk connected to the channels CH1 to CHm by transmitting signals through the channels CH1 to CHk.

The memory device 400 may include a plurality of non-volatile memory devices NVM1, NVM2, and NVMk. For example, at least one of the non-volatile memory devices NVM1, NVM2, and NVMk may correspond to the NVM 120 of FIG. 1. The non-volatile memory devices NVM1, NVM2, and NVMk may be grouped in sets, with a grouped set connected to a respective channel CH1, CH2, and CHk. In other words, first non-volatile memory devices NVM1 may be connected to a first channel CH1, second non-volatile memory devices NVM2 may be connected to a second channel CH2, and k-th non-volatile memory devices NVMk may be connected to a k-th channel CHk. In some embodiments, the non-volatile memory devices NVM1, NVM2, and NVMk may each be implemented as an arbitrary memory unit capable of operating according to an individual command from the memory controller 300. For example, the non-volatile memory devices NVM1, NVM2, and NVMk may each be implemented as a chip or a die, but the inventive concepts are not limited thereto.

The memory controller 300 may transmit and receive signals to and from the memory device 400 through the channels CH1 to CHk. For example, the memory controller 300 may transmit commands, addresses, and data to the memory device 400 and/or receive data from the memory device 400 through the channels CH1 to CHk. Through each channel, the memory controller 300 may select one from among the non-volatile memory devices NVM1, NVM2, and NVMk connected to a corresponding channel and transmit and receive signals with a selected non-volatile memory device. Also, the memory controller 300 may transmit and receive signals to and from the memory device 400 in parallel through different channels. For example, the memory controller 300 may transmit a command to the memory device 400 through a second channel CH2 while another command is being transmitted to the memory device 400 through a first channel CH1.

The memory controller 300 may include a read reclaim manager 310, a hot data determiner 320, and an address manager 330. The address manager 330 may store a mapping table 331. For example, the mapping table 331 may correspond to the mapping table 141 of FIG. 14.

The read reclaim manager 310 and the hot data determiner 320 may respectively correspond to the read reclaim manager 111a and the hot data determiner 111b shown in FIG. 1 and may be implemented substantially similar thereto. Also, the address manager 330 may correspond to the address manager 111c shown in FIG. 13 and may be implemented substantially similar thereto. Accordingly, aspects of the embodiments described above with reference to FIGS. 1 to 15 may be applied to the storage devices, such as that shown in FIG. 16.

Figure 17:
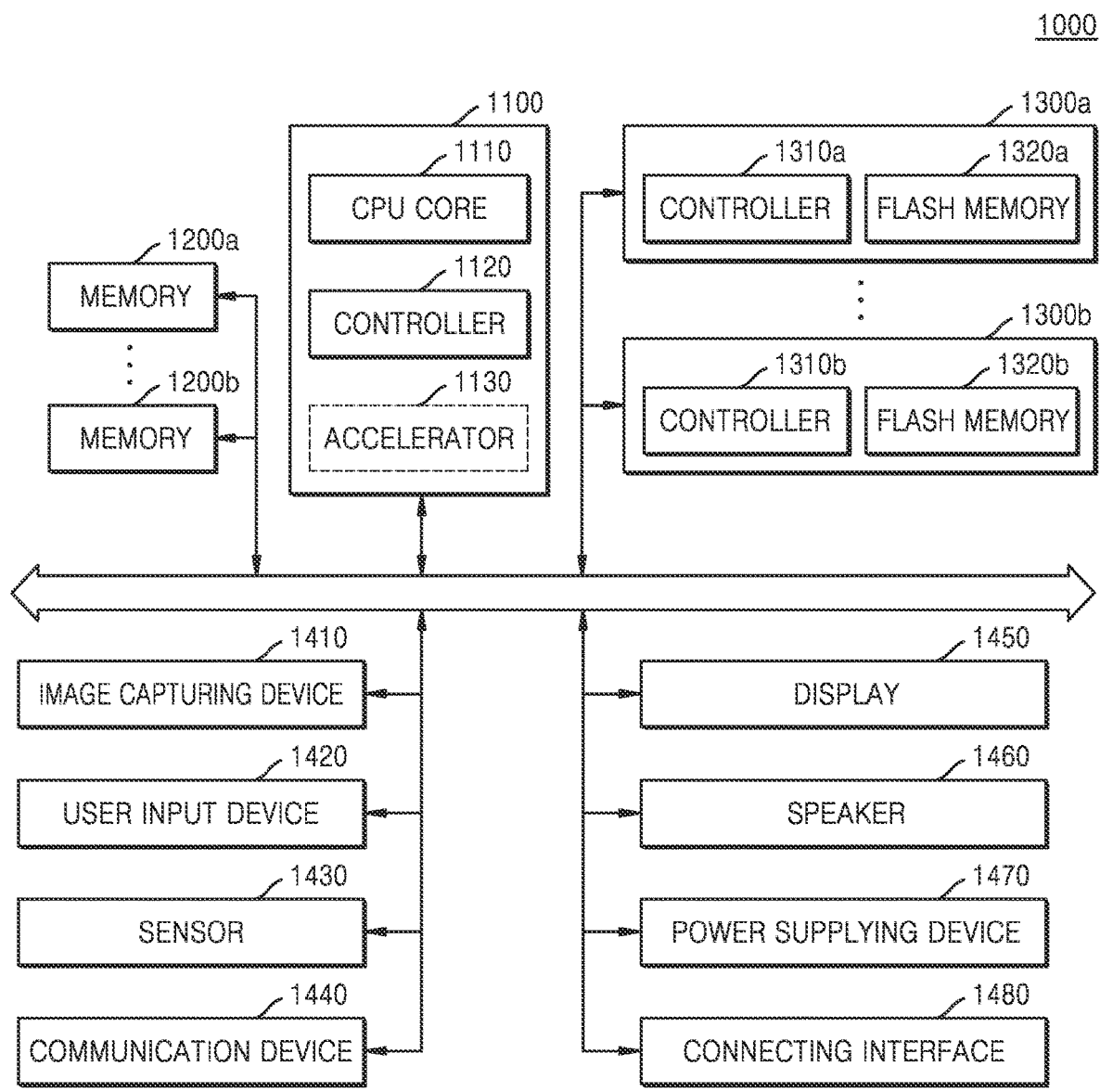
FIG. 17 is a block diagram showing a system to which storage devices according to some embodiments of the inventive concepts may be applied.

FIG. 17 is a diagram of a system 1000 to which a storage device according to some embodiments of the present disclosure may be applied. The system 1000 of FIG. 17 may be a mobile system, such as a portable communication terminal (e.g., a mobile phone), a smartphone, a tablet personal computer (PC), a wearable device, a healthcare device, or an Internet of things (IOT) device. However, the system 1000 of FIG. 17 is not necessarily limited to mobile systems, and in some embodiments the system 1000 may be a PC, a laptop computer, a server, a media player, or an automotive device (e.g., a navigation device).

Referring to FIG. 17, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, and more specifically, may control operations of other components included in the system 1000. The main processor 1100 may be implemented as a general-purpose processor, a dedicated processor, or an application processor, as non-limiting examples.

The main processor 1100 may include at least one CPU core 1110 and may further include a controller 1120 configured to control the memories 1200a and 1200b and/or the storage devices 1300a and 1300b. In some embodiments, the main processor 1100 may further include an accelerator 1130, which may be a dedicated circuit for a high-speed data operation, such as an artificial intelligence (AI) data operation. The accelerator 1130 may include a graphics processing unit (GPU), a neural processing unit (NPU) and/or a data processing unit (DPU), and in some embodiments may be implemented as a chip that is physically separate from the other components of the main processor 1100.

The memories 1200a and 1200b may be used as main memory devices of the system 1000. Each of the memories 1200a and 1200b may include a volatile memory, such as static random access memory (SRAM) and/or dynamic RAM (DRAM), and/or each of the memories 1200a and 1200b may include non-volatile memory, such as a flash memory, phase-change RAM (PRAM) and/or resistive RAM (RRAM). Memory 1200a may be a volatile memory and memory 1200b may be a non-volatile memory. In some embodiments, the memories 1200a and 1200b may be implemented in the same package as the main processor 1100.

The storage devices 1300a and 1300b may serve as non-volatile storage devices configured to store data regardless of whether power is supplied thereto, and in some embodiments may have larger storage capacity than the memories 1200a and 1200b. The storage devices 1300a and 1300b may respectively include storage controllers 1310a and 1310b (STRG CTRL) and Non-Volatile Memories (NVMs) 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as PRAM and/or RRAM.

The storage devices 1300a and 1300b may be physically separated from the main processor 1100 and included in the system 1000, or may be implemented in the same package as the main processor 1100. In addition, the storage devices 1300a and 1300b may have types of solid-state devices (SSDs) or memory cards and may be removably combined with other components of the system 1000 through an interface, such as the connecting interface 1480 that is described below. The storage devices 1300a and 1300b may be devices to which a standard protocol, such as a UFS, an eMMC, or an NVMe, is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and may include a touch pad, a keypad, a keyboard, a mouse, and/or a microphone.

The sensor 1430 may detect various types of physical quantities, which may be obtained from the outside of the system 1000, and may convert the detected physical quantities into electric signals. The sensor 1430 may include a temperature sensor, a pressure sensor, an illuminance sensor, a position sensor, an acceleration sensor, a biosensor, and/or a gyroscope sensor, as non-limiting examples.

The communication device 1440 may transmit and receive signals between other devices outside the system 1000 according to various communication protocols. The communication device 1440 may include an antenna, a transceiver, and/or a modem, as non-limiting examples.

The display 1450 and the speaker 1460 may serve as output devices configured to output visual information and auditory information, respectively, to the user of the system 1000.

The power supplying device 1470 may appropriately convert power supplied from a battery (not shown) embedded in the system 1000 and/or an external power source, and may supply the converted power to each of components of the system 1000.

The connecting interface 1480 may provide part of connection between the system 1000 and an external device, which may be connected to the system 1000 and capable of transmitting and receiving data to and from the system 1000. The connecting interface 1480 may be implemented using various interface schemes, non-limiting examples of which include advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and/or a compact flash (CF) card interface.

While the inventive concepts have been particularly shown and described with reference to some examples of embodiments thereof, it will be understood that various changes in form and details may be made therein without departing from the scope of the following claims.

What is claimed is:

1. A storage device comprising:
a non-volatile memory comprising a plurality of memory blocks including a first block and a second block, wherein the first block includes first memory cells each configured to store N-bit data, and the second block includes second memory cells each configured to store M-bit data; and
a storage controller configured to, during a read reclaim operation on the first block, determine read hot data from among a plurality of pieces of data stored in the first block and write the determined read hot data in the second block,
wherein the storage controller comprises a hot data determiner configured to, during the read reclaim operation, select a first word line that corresponds to a first page in which a number of error bits is equal to or greater than a threshold value from among pages of the first block and select a third word line that corresponds to a second page in which a number of error bits is equal to or greater than the threshold value from among the pages of the first block, the first and second page corresponding to a first string select line, and the hot data determiner configured to determine, as the read hot data, data stored in at least one page that corresponds to a second word line that is adjacent to the first word line and between the first word line and the third word line and corresponding to a second string select line that is adjacent to the first string select line, and
wherein N and M are positive integers and N is greater than M.

2. The storage device of claim 1, further comprising a read reclaim manager configured to manage read reclaim operations for the first block and the second block,
wherein the read reclaim manager is configured to update a physical address corresponding to the read hot data from an address of the first block to an address of the second block.

3. The storage device of claim 1, wherein the storage controller further comprises:
a read reclaim manager configured to manage read reclaim operations for the first block and the second block; and
an address manager configured to update a physical address that corresponds to the read hot data from an address of the first block to an address of the second block.

4. The storage device of claim 1, wherein, when there is no empty space in the second block, the storage controller is configured to write the read hot data to a block that includes memory cells each storing N-bit data from among the memory blocks.

5. The storage device of claim 1, wherein N is 2 and the first memory cells correspond to multi level cells (MLCs), and
wherein M is 1 and the second memory cells correspond to single level cells (SLCs).

6. The storage device of claim 1, wherein the non-volatile memory further includes a third block including third memory cells each configured to store L-bit data, and
wherein the storage controller is configured to write the read hot data in either one of the second block or the third block.

7. The storage device of claim 6, wherein N is 3 and the first memory cells correspond to triple level cells (TLCs),
wherein M is 2 and the second memory cells correspond to multi level cells (MLCs), and
wherein L is 1 and the third memory cells correspond to single level cells (SLCs).

8. The storage device of claim 6, wherein the non-volatile memory further comprises a fourth block comprising fourth memory cells each configured to store K-bit data, and
wherein the storage controller is configured to write the read hot data in a selected one of the second block, the third block, or the fourth block.

9. The storage device of claim 8, wherein N is 4 and the first memory cells correspond to quadruple level cells (QLCs),
wherein M is 3 and the second memory cells correspond to triple level cells (TLCs),
wherein L is 2 and the second memory cells correspond to multi level cells (MLCs), and
wherein K is 1 and the fourth memory cells correspond to single level cells (SLCs).

10. A storage device comprising:
a non-volatile memory comprising a single level cell (SLC) block and a multi level cell (MLC) block, wherein the SLC block and the MLC block each includes word lines stacked in a direction vertical to a substrate and a first string select line and a second string select line adjacent to each other in a horizontal direction; and a storage controller configured to, during a read reclaim operation on the MLC block, determine read hot data from among a plurality of pieces of data stored in the MLC block and write the read hot data in the SLC block, wherein, during the read reclaim operation, the storage controller is further configured to:

select a first page and a second page each having numbers of error bits equal to or greater than a threshold value and each corresponding to the first string select line in the MLC block, and determine, as the read hot data, data stored in at least one page that corresponds to the second string select line and a third word line, the third word line at a third vertical level between a first vertical level of a first word line, which corresponds to the first page, and a second vertical level of a second word line, which corresponds to the second page.

11. An operating method of a storage controller configured to control a non-volatile memory, the operating method comprising:

performing, during a read reclaim operation on a source block from among a plurality of memory blocks included in the non-volatile memory, a read operation on a plurality of pages of the source block;

selecting, from the plurality of pages, a first page in which a number of error bits is equal to or greater than a threshold value;

selecting, from the plurality of pages, a second page in which a number of error bits is equal to or greater than the threshold value;

determining, as read hot data, data stored in at least one page of a second word line, wherein the second word line is adjacent to a first word line corresponding to the selected first page, and wherein the first page and second page each correspond to a first string select line, and the at least one page of the second word line corresponds to a second string select line that is adjacent to the first string select line; and writing the read hot data in a target block from among the memory blocks.

12. The operating method of claim 11, wherein the second word line is between a third word line corresponding to the second page and the first word line.

13. The operating method of claim 11, wherein the source block comprises first memory cells each storing N-bit data, wherein the target block comprises second memory cells each storing M-bit data, and wherein N and M are positive integers and N is greater than M.

14. The operating method of claim 13, wherein the source block comprises a multi-level cell (MLC) block, and wherein the target block comprises a single level cell (SLC) block.

15. The operating method of claim 11, wherein the plurality of memory blocks comprises first memory blocks having memory cells each storing N-bit data and second memory blocks having memory cells each storing M-bit data, with M and N both positive integers and N greater than M, wherein the source block corresponds to one of the first memory blocks, and wherein, when there is no empty space in any second memory block of the plurality of memory blocks, another of the first memory blocks is selected as the target block.

16. The operating method of claim 11, further comprising updating a write address of the read hot data from an address of the source block to an address of the target block.

17. The operating method of claim 11, wherein the source block comprises a triple level cell (TLC) block, and wherein the target block comprises a multi-level cell (MLC) block or a single level cell (SLC) block.

* * * * *